(12) United States Patent
Burchardt et al.

(10) Patent No.: US 11,443,861 B2
(45) Date of Patent: Sep. 13, 2022

(54) ANALYSIS DEVICE FOR THE DETECTION OF FISSION PRODUCTS BY MEASUREMENT OF A RADIOACTIVITY

(71) Applicant: FRAMATOME GmbH, Erlangen (DE)

(72) Inventors: Carsten Burchardt, Erlangen (DE); Christoph Zimmermann, Möhrendorf (DE); Jan Langenberger, Effeltrich (DE); Marc Michalsky, Oderwitz (DE); Peter Zeh, Eckental (DE); Thomas Albrecht, Fürth (DE); Wolfgang Hummel, Neumarkt (DE)

(73) Assignee: FRAMATOME GmbH, Erlangen (DE)

( * ) Notice: Subject to any disclaimer, the term of this patent is extended or adjusted under 35 U.S.C. 154(b) by 19 days.

(21) Appl. No.: 16/627,964

(22) PCT Filed: Jun. 14, 2018

(86) PCT No.: PCT/EP2018/065899
§ 371 (c)(1),
(2) Date: Dec. 31, 2019

(87) PCT Pub. No.: WO2019/007661
PCT Pub. Date: Jan. 10, 2019

(65) Prior Publication Data
US 2021/0110945 A1 Apr. 15, 2021

(30) Foreign Application Priority Data
Jul. 4, 2017 (DE) .................. 10 2017 114 835.3

(51) Int. Cl.
*G21C 17/07* (2006.01)
*G21C 17/00* (2006.01)
(Continued)

(52) U.S. Cl.
CPC ........... *G21C 17/07* (2013.01); *G21C 17/002* (2013.01); *G01M 3/224* (2013.01); *G01T 1/003* (2013.01); *G21C 11/00* (2013.01)

(58) Field of Classification Search
CPC ..... G21C 17/07; G21C 17/002; G01M 3/224; G01T 1/003
(Continued)

(56) References Cited

U.S. PATENT DOCUMENTS 4,039,376 A * 8/1977 Wachter ................. G21C 17/07
376/252
4,426,350 A * 1/1984 Zegar ................... G21C 13/024
376/283
(Continued)

FOREIGN PATENT DOCUMENTS

DE 19542330 A1 5/1996
JP S54153995 A 12/1979
(Continued)

OTHER PUBLICATIONS

Corresponding Search Report PCT/EP2018/065899.

*Primary Examiner* — Jack W Keith
*Assistant Examiner* — Daniel Wasil
(74) *Attorney, Agent, or Firm* — Davidson, Davidson & Kappel, LLC

(57) ABSTRACT

An analysis device for detecting fission products by measurement of a radioactivity includes a first line for carrying a liquid sample, a first detector connected to the first line and designed for measuring the radioactivity of fission products contained in the liquid sample, a second line for carrying a gas sample and a second detector connected to the second line and designed for measuring the radioactivity of fission products contained in the gas sample. The analysis device includes a separation device for separating gas from the first line carrying the liquid sample, which line has an outlet
(Continued)

opening into the second line for gas separated from the liquid sample. The outlet opening fluidly connected to the second lines in such a manner that the gas separated from the liquid sample is suppliable as a gas sample to the second detector for measuring the radioactivity of fission products contained therein.

20 Claims, 3 Drawing Sheets

(51) Int. Cl.
  *G01M 3/22* (2006.01)
  *G01T 1/00* (2006.01)
  *G21C 11/00* (2006.01)

(58) Field of Classification Search
  USPC .................................................. 376/251, 253
  See application file for complete search history.

(56) References Cited

U.S. PATENT DOCUMENTS

| | | |
|---|---|---|
| 4,696,788 A | 9/1987 | Seli |
| 5,546,435 A | 8/1996 | Collin et al. |
| 6,345,082 B1 | 2/2002 | Galioto et al. |
| 2002/0075984 A1* | 6/2002 | Knecht .................. G21C 17/07 376/253 |

FOREIGN PATENT DOCUMENTS

| | | |
|---|---|---|
| JP | 07-167983 A | 7/1995 |
| JP | 2000-321392 A | 11/2000 |

* cited by examiner

ANALYSIS DEVICE FOR THE DETECTION OF FISSION PRODUCTS BY MEASUREMENT OF A RADIOACTIVITY

The invention relates to an analysis device for the detection of fission products by measurement of a radioactivity and an analysis system comprising such an analysis device.

BACKGROUND

Operators of nuclear power plants must provide clear evidence that the fuel rods arranged in fuel assemblies are tight, before a reuse of the fuel assembly occurs in the next reactor cycle or before the fuel assembly is transported away for off-site storage. The detection typically occurs by means of so-called sipping process or sipping tests. These are leakage tests, in which radioactive fission products are expelled from the potentially leaking fuel rods. Subsequently, a gas- or liquid sample is taken from the environment of the fuel rod and examined with respect to its radioactivity.

Different analysis systems and methods typically referred to as sipping systems are known, such as, for example, the so-called mast-sipping/telescope-sipping for pressurized water reactors (PWR), water-water energy reactors (WWER) and boiling water reactors (BWR), incore-sipping for BWR, box-sipping/vacuum-sipping for PWR, WWER and BWR and single rod-sipping for PWR and BWR. These analysis systems and methods differ primarily in their integration into different sequences of the process, in order to obtain an analysis result at a specific point in time. If, for example, such an analysis result is needed before the unloading of the reactor core, then the incore-sipping is used, in which the tightness of fuel assemblies or fuel rods in the reactor core is checked. If a reliable analysis result is to be produced with as little time loss as possible, then, for example, a mast-sipping method can be used in the course of the core unloading. In the case of mast sipping, the removal of a sample possibly containing fission products typically occurs via the interior region of the mast of the fuel assembly loading machine.

SUMMARY

Depending on the type of defect of the fuel rod or depending on the length of the decay time clear evidence with the aid of these known test methods can be difficult. In particular, this problem results in the case of a longer storage time, since it is necessary to assume that a defect could have occurred after a sipping test was performed and under certain circumstances a sipping test which occurred in the past and possibly after several manipulations which occurred in the meantime.

A defect detection is therefore difficult in particular in the case of very long storage times, since in this case usually only Cs-137 is still available as a detectable nuclide in the water phase. A very high activity background in the immediate environment, from which the sample is taken, is also problematic, or if due to the size or type of the defect a fission gas can completely escape from the fuel rod, so that said fission gas is no longer available for analysis.

The problem addressed by the present disclosure is to provide a novel analysis device for detecting fission products, which is suitable for use in different analysis- or sipping systems and makes possible a reliable detection also under difficult boundary conditions and/or in the case of different types of leakage.

An analysis device for the detection of fission products by measurement of a radioactivity, comprises
a first line for carrying a liquid sample,
a first detector connected to the first line and designed for measuring the radioactivity of fission products contained in the liquid sample,
a second line for carrying a gas sample and
a second detector connected to the second line and designed for measuring the radioactivity of fission products contained in the gas sample.

According to the present disclosure, a separation device is provided for separating gas from the first line carrying the liquid sample, which line has an outlet opening for removed gas opening into the second line in such a manner that the removed gas can be supplied as a gas sample to the first detector for measuring the radioactivity of fission products contained therein.

The present disclosure for the first time provides an analysis device, which is suitable for different sipping methods and thus for the detection of a plurality of different types of leakage, such as, for example, small continuous hairline cracks in fuel rods, visible open partial regions on the side of fuel rods, missing or defective end caps and/or broken fuel rods. The analysis device is designed in particular to detect releasible fission products or nuclides in different concentrations. Gaseous fission products can be removed directly or separated by means of the separation device from the liquid sample by degassing. In particular the nuclides krypton and/or xenon are preferably detectable as gaseous fission products.

In particular it is possible to continuously supply gas- and/or liquid samples to the first and/or second detector. In this sense, the terms gas sample or liquid sample also refer to continuously extracted and supplied volume flows, therefore, gas flows or liquid flows.

Analysis systems based on sipping are used, in particular, depending on the fission products to be detected. Incore sipping, in which a testing of the fuel rods in the reactor core takes place, is used, for example, in the case of a short decay or storage time. For this purpose, it can be provided in particular, to detect xenon (Xe-133), krypton (Kr-85), iodine (I-131) and/or cesium (Cs-134 and/or Cs-137) as fission products. Mast sipping, in which the removal of the liquid- and/or gas sample takes place during the unloading of the reactor core or transfer of the fuel assemblies in the fuel assembly storage basin, is used, for example, in the case of short to longer decay or storage times. For this purpose, depending on the type of leakage, it can be provided in particular to detect Kr-85, Cs-134 and/or Cs 137 as fission products. These fission products can also be detected with the aid of box sipping and/or single-rod sipping, in particular as part of the repair process on the fuel assembly. In the case of yet longer decay times the nuclides Kr-85 and/or Cs-137 can, for example, be detected as fission products. The removal of the gas- and/or liquid samples containing these fission products takes place preferably as part of the mentioned mast-, box- or single-rod sipping processes. In the case of very long decay- or storage times, typically only Cs-137 is available as a fission product for detection. The detection occurs in this case preferably by means of box sipping under additional heating.

To remove the gas- and/or liquid sample, a device is used, which is designed to expel fission products from at least one in particular defective fuel rod. The device is furthermore designed for removing liquid- and/or gas samples from the environment of the at least one fuel rod. The fission products possibly expelled via an existing defect site are also contained in part in the removed liquid- and/or gas sample. According to embodiments of the invention an analysis system based in particular on sipping comprises an analysis device, which is fluidically connected to the above-described device in order to supply the liquid- and/or gas sample.

The concrete design in question of the device for expelling fission products and for removing gas- and/or liquid samples containing such fission products is different in the case of incore-, mast-, vacuum- or single-rod sipping systems. Regardless of this, the analysis device can be used in all of the mentioned sipping systems, since the analysis device can be supplied with both a removed gas—as well as a removed liquid sample. With the aid of the first and the second detector a broad range of different, in particular gaseous or dissolved fission products can be detected. This makes it possible to use the analysis device almost independently of the decay- or storage time of the fuel rods to be examined.

The expulsion of fission products from a defective fuel rod takes place, for example, by heating the fuel rod by suppling heat. For this purpose, for example, a self-heating of the fuel assembly or of the fuel rod by partial withdrawal of the coolant or by interruption of the convection can take place. Alternatively or additionally, an escape of the fission products via a possibly existing defect site can be assisted by pressure reduction, in particular, by lifting the fuel rod.

The analysis device provided for the analysis of the in particular dissolved and/or gaseous fission products preferably has an inlet for the separation device, which is arranged downstream of the first detector. The liquid sample removed in particular from the immediate environment of a leaking fuel rod is thus only supplied to the separation device after passing through the first detector. The liquid sample can thus, in particular, be analyzed with regard to dissolved fission products, before possibly existing gaseous fission products are separated from the liquid phase with aid of the separation device.

Preferably the first detector is designed for measuring gamma radiation. Particularly preferably the first detector is a gamma spectrometer. Such devices are designed, optionally in conjunction with a corresponding evaluation routine, to develop and to evaluate in particular multiple lines of the detected gamma spectrum. In conjunction with a previously measured background activity statements about the relative concentration of the gamma-emitting fission products in the liquid sample are then possible.

The second detector is preferably designed for measuring beta radiation. Particularly preferably the second detector is a scintillation counter. The second detector is thus used for determining gaseous beta-emitting fission products, which were removed directly from the environment of a leaking fuel rod and/or were separated from the liquid sample.

Particularly preferably the first and/or the second detector is provided with a radiation absorbing radiation shield for shielding against ambient radiation, so that its influence on the measurement result is minimized.

Preferably, a closable outlet, which forms a sampling point for a water sample, branches off from the first line. This water sample serves in limit cases as a further possibility for a more targeted examination in the laboratory, in order to be able to detect other relevant fission products, that allow conclusions to be drawn about a defective fuel rod, in the water- or separated gas phase.

In a preferred embodiment a drying device and/or drying means for drying a volume flow containing a gas sample to be analyzed is arranged downstream of the first detector and in particular upstream, that is, before the second detector, which in particular is designed for measuring beta radiation. Moisture, which is contained in the gas sample supplied, can thus be separated by means of the drying device and/or by means of the drying means, in particular, silica gel. The moisture discharge can take place in particular continuously. Thus, it can be prevented that a water film or water drops can be formed on the second detector, which could distort the measurement due to shielding.

Preferably, filling materials, in particular, filling materials with a large outer surface, are arranged within the separation device, which serves to separate gas from the liquid sample, for forming the stripping gas into fine beads and thus for increasing the phase boundary interfaces. Thus, the separation of gaseous fission products from the liquid sample can be assisted.

Preferably, a membrane contactor (membrane degassing) can also be used, with which a material separation by means of diffusive material transport through a porous membrane is used.

An analysis system for the identification of defective fuel rods comprises the above-described analysis device and a device designed for the expulsion of fission products from at least one defective fuel rod and for removal of liquid- and/or gas samples containing fission products from the environment of the at least one fuel rod. Such a device can also be referred to as a sipping device. According to embodiments of the invention the device for supplying the liquid- and/or gas samples containing fission products is connected fluidically to the analysis device. In particular, it is provided to feed a liquid sample removed from the immediate environment of a leaking fuel rod into the first line of the analysis device and a gas sample removed from the immediate environment of a leaking fuel rod into the second line of the analysis device.

Preferably, the device of the analysis system designed for removing water- and gas samples forms a lowerable structure, in particular a structure lowerable in a fuel assembly storage basin, transport container basin or reactor basin. The device has an inner duct-shaped intermediate space, in which the at least one fuel rod to be examined or the fuel assembly comprising at least one fuel rod can be introduced. An upper end of the duct-shaped intermediate space can be covered by a hood element in such a manner that above the intermediate space and below the hood element a gas cushion can be formed by blowing in a gas. The duct-shaped intermediate space is in particular not designed fluid-tight, so that the surrounding water can enter at least via openings in a lower region. The device lowerable in the fuel assembly storage basin is thus of the type of a box-sipping device. The introduction of the gas cushion serves, inter alia, to interrupt the heat convection to the basin water. Water, which in particular is heated by self-heating of the fuel assembly in the duct-shaped intermediate space, can no longer escape via the upper end of the duct-shaped intermediate space, since the latter is closed by the gas cushion, which is formed within the hood element. This promotes an accumulation of fission products expelled from the fuel rod or the fuel rods in the upper region of the duct-shaped intermediate space.

Preferably the duct-shaped intermediate space is formed by a plurality of structural elements stacked one above another on a lowerable work support and which can be fastened to one another. Such a design is characterized in that it can be built up rapidly and flexibly under water, in particular, in the fuel assembly storage basin or transport container loading basin, with the aid of corresponding gripping tools.

Preferably the structural element or the structural elements which form a lower section of the duct-shaped intermediate space have a plurality of openings, in order to permit a water exchange with the basin water of the surrounding fuel assembly storage basin.

The hood element and/or the structural elements are preferably designed with a double wall, wherein insulating material is introduced between an outer and an inner wall of the hood element and/or of the respective structural element for thermal insulation or a vacuum was applied for thermal insulation. As a result, a heat transfer to the surrounding basin water is minimized and the fuel assembly introduced into the duct-shaped intermediate space or the fuel rod introduced there can be heated, in order to expel fission products via any existing points of leakage.

The hood element is preferably designed remotely controllably adjustable with respect to a vertical axis of the device, in particular height adjustable parallel to the vertical axis and/or rotatable about the vertical axis, by means of a drive unit. In this way, the hood elements can be positioned, in order in particular to free up access to the duct-shaped intermediate space for loading or unloading with a fuel assembly.

Alternatively thereto the hood element can be designed to be adjusted manually by means of a rod tool.

In a preferred embodiment a heating device is arranged on the lower end of the duct-shaped intermediate space, which is opposite to the hood element. If necessary, this separate hood element serves to support the self-heating of the fuel rods to be examined. This makes it possible also to examine fuel rods or a fuel assembly after a longer decay or storage time.

Preferably, a temperature sensor is arranged within the duct-shaped intermediate space for measuring the temperature of the basin water contained therein and/or of the gas cushion contained therein, so that in particular the heating process for the expulsion of fission products from the defective fuel rods can be monitored.

BRIEF SUMMARY OF THE DRAWINGS

The invention is also described in detail below with respect to further features and advantages by means of the description of embodiments and with reference to the attached drawing.

DETAILED DESCRIPTION

The same parts or parts corresponding to one another are provided with the same reference signs in all figures.

Figure 1:
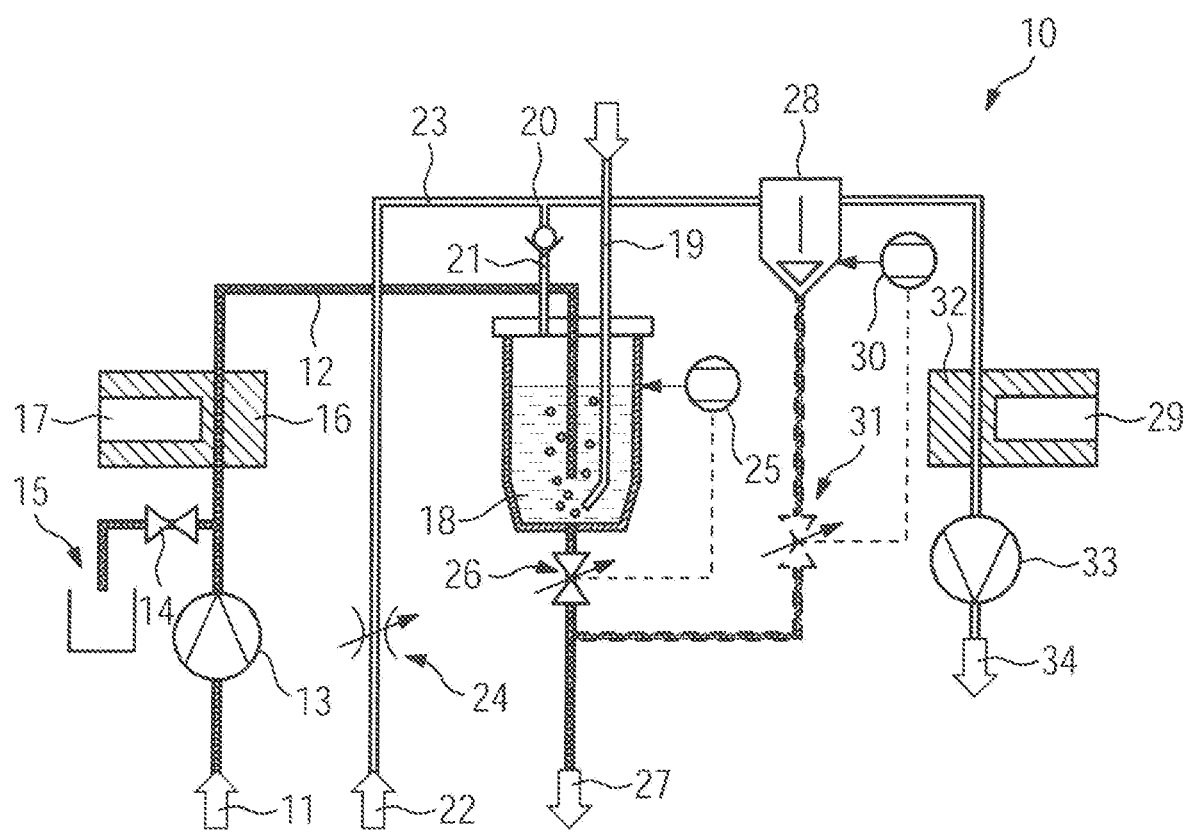
FIG. 1 shows the schematic structure of an analysis device for the detection of fission products by measurement a radioactivity.

FIG. 1 shows the schematic structure of an analysis device 10 for the detection of fission products by measurement of a radioactivity. The analysis device is intended to be provided in conjunction with a sipping device, in particular with the device 100 depicted in FIGS. 2 and 3, to form an analysis system, which is designed to identify defective fuel rods or fuel assemblies containing defective fuel rods.

The analysis device 10 comprises a gas analysis section and a liquid analysis section. Liquid samples can be supplied via a first inlet 11 to a first line 12. For sucking in the liquid sample a pump 13, for example, a water jet pump, is connected on the inlet side to the first line 12. A further outlet 15, which can be shut off via valve 14, is used for taking a water sample, in particular, a water sample from a fuel assembly storage- or reactor basin, for further targeted examination of said sample in a laboratory.

The liquid sample carried in the first line 12 passes through a region shielded by a radiation shield 16, in which a first detector 17 designed for the detection of gamma radiation is arranged. Specifically, in the embodiment shown and not to be interpreted in a limited manner, this is a gamma spectrometer. At the end of the liquid analysis section a separation device 18 is arranged, which is designed to separate in particular any dissolved, gaseous components present in the liquid sample. In the depicted separation device 18 forms a liquid reservoir, into which stripping gas can be blown via a supply line 19, in particular in the counter-flow process. Gas taken from the liquid sample can be supplied to the gas analysis section via a connecting line 21 having a check valve 20. Filling materials, in particular filling materials with a large outer surface, are arranged within the separation device 18, in order to increase the phase boundary interfaces between the gaseous and the liquid phase.

The water level within the separation device 18 can be adjusted and in particular regulated via a level regulator 25 with regulator valve 26. Excess water can be discharged via the outlet 27, in particular, to a basin cleaning system of the fuel assembly storage basin. The embodiment of the separation device as a membrane contactor is not explicitly depicted in the figures.

Gas samples can be supplied both via a second inlet 22 as well as via the connecting line 21 to a second line 23 of the gas analysis section. In the region of the second inlet 22 a throttle valve 24 is arranged, so that, if necessary, a volume flow containing the gas sample can be adapted and in particular regulated.

The gas analysis section furthermore comprises a drying device 28, which is arranged downstream of a second detector 29. The drying device 28 is used in particular for separating any moisture or water contained in the gas volume flow. A further level regulator 30 with further regulator valve 31 ensures a continuous water discharge. Discharged water can be supplied via the outlet 27 in particular to the basin cleaning system of the fuel assembly storage basin.

The second line 23 is also shielded in the region of the second detector 29 by a radiation shield 32 against radiation from the environment. The second detector 29 is designed in the depicted example for the measurement of beta radiation as a scintillation counter.

At the end of the gas analysis section a gas pump 33, for example, a membrane pump is located. Gas can be supplied to a nuclear ventilation system, in particular, of a nuclear power plant via a further outlet 34.

The analysis device is operated for the detection of fission products, in particular according to the method described below:

A reference sample, consisting of water from the fuel assembly storage basin is taken to determine a background activity. Subsequently, a liquid sample from the immediate environment of fuel assembly containing the fuel rod to be examined or the fuel rods to be examined is sucked in by means of the pump 13.

Optionally, a further sample is taken as an extra sample for more detailed examination in the radiochemistry laboratory.

Subsequently, the liquid sample containing the removed and potentially detectable fission products passes through the region of the first detector 17 shielded by the radiation shield 16, so that radiation influences from the environment, in particular, from the basin floor area of the nuclear power plant are largely excluded. The first detector 17 designed for the detection of gamma radiation as a gamma spectrometer preferably possesses an evaluation routine for the evaluation and development of multiple lines of the detected gamma spectrum. The objective of the evaluation of the gamma spectrum is to determine the relative concentration of fission products contained in the liquid sample, therefore, of the nuclide components emitting gamma radiation, in order to determine whether a defect exists in comparison to the previously determined background activity.

The liquid sample is subsequently fed into the separation device 18, in which stripping gas is blown in, preferably in the counter-flow process and using filling materials for mixing and increasing the phase boundary interface between the gaseous and the liquid phase. The thus induced desorption process brings it about that a part of the blown in stripping gas passes into the water of the liquid sample fed in. At the same time, bound gaseous, radioactive fission products are released from the liquid sample (stripping-separation process). With the level regulator 25 a separation surface is maintained in the separation device 18, via which the gas, which was taken from the liquid sample, collects. Excess water is drained via the regulator valve 26 and disposed of via the basin cleaning system of the fuel assembly storage basin. The gas extracted from the liquid sample is supplied via a check valve 20 to the second line 23 and thus to the gas analysis section.

The taking of a gas sample is activated by activation of the gas pump 33, which is mounted at the end of the gas analysis section. Initially, a gas sample or a gas sample flow is fed via the second inlet 22 and the throttle valve 24 into the second line 23. In this connection, a defined volume flow is set. Before the gas flow containing the gas sample is passed over the second detector 29, the latter is dried in the drying device 28, since the measurement results can be distorted by a water film or by water drops on the detector membrane. An active dryer can be provided as drying device 28. In this case, a reduction of the dew point takes place by cooling and discharging the water. A continuous water discharge is ensured with the level regulator 30, which accordingly regulates the regulator valve 31. Alternatively or additionally the water discharge can take place with the aid of drying means (for example, silica gel). The second detector 29 is designed to detect beta radiation and is designed in the depicted example as a scintillation counter. With the aid of the second detector 29 and a corresponding evaluation routine the relative concentration of the beta-emitting nuclide components relative to the background is determined.

During the sipping process, therefore during the removal of the liquid- and/or gas sample from the environment of the fuel rod or fuel assembly to be examined, an inherent safety must be ensured. For this purpose, in particular, supercriticality is to be excluded and adequate cooling is to be ensured. In addition, stringent radiation protection requirements ("As Low As Reasonably Achievable", ALARA) exist for such analysis systems based on sipping.

Figure 2:
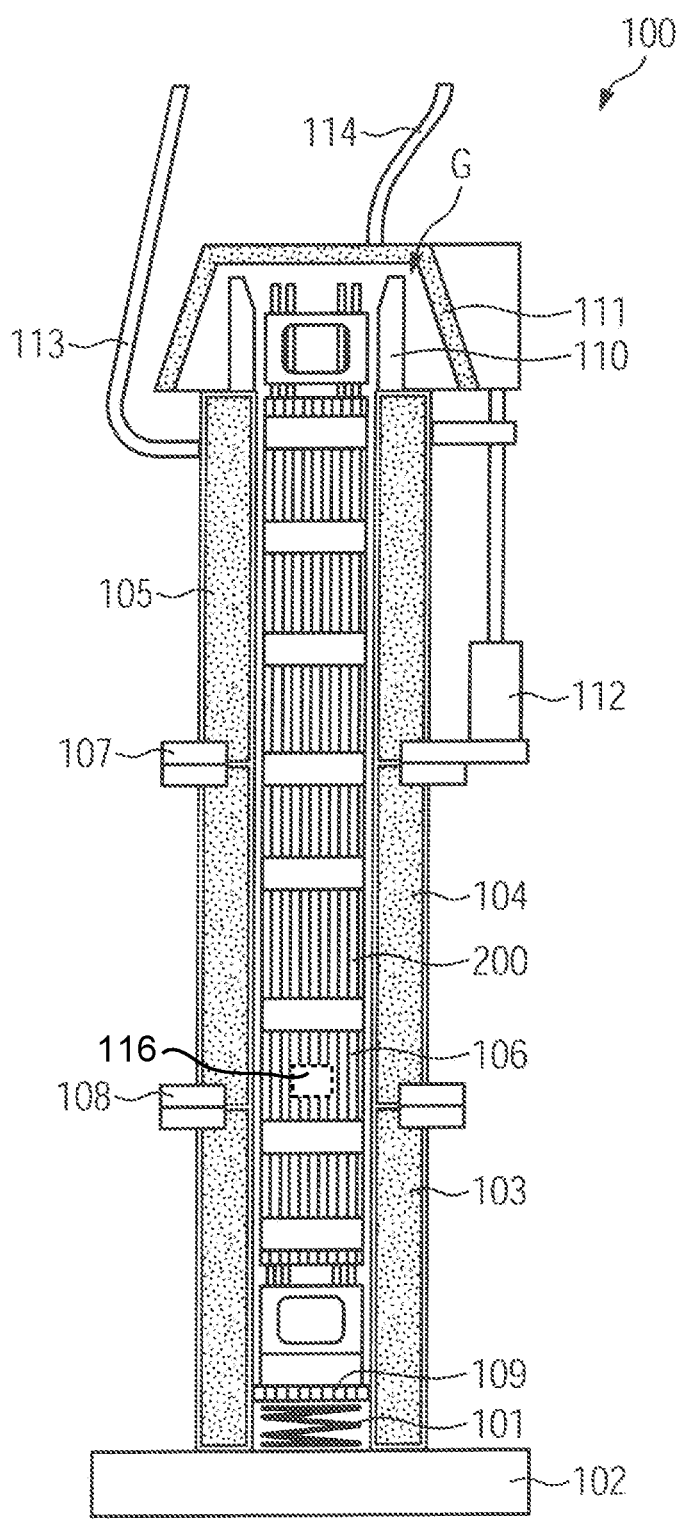
FIG. 2 shows a device for expelling fission products from at least one defective fuel rod and for removing liquid- and/or gas samples containing fission products from the environment of the at least one fuel rod in the closed state and FIG. 3 shows the device of FIG. 2 in the open state.
Figure 3:
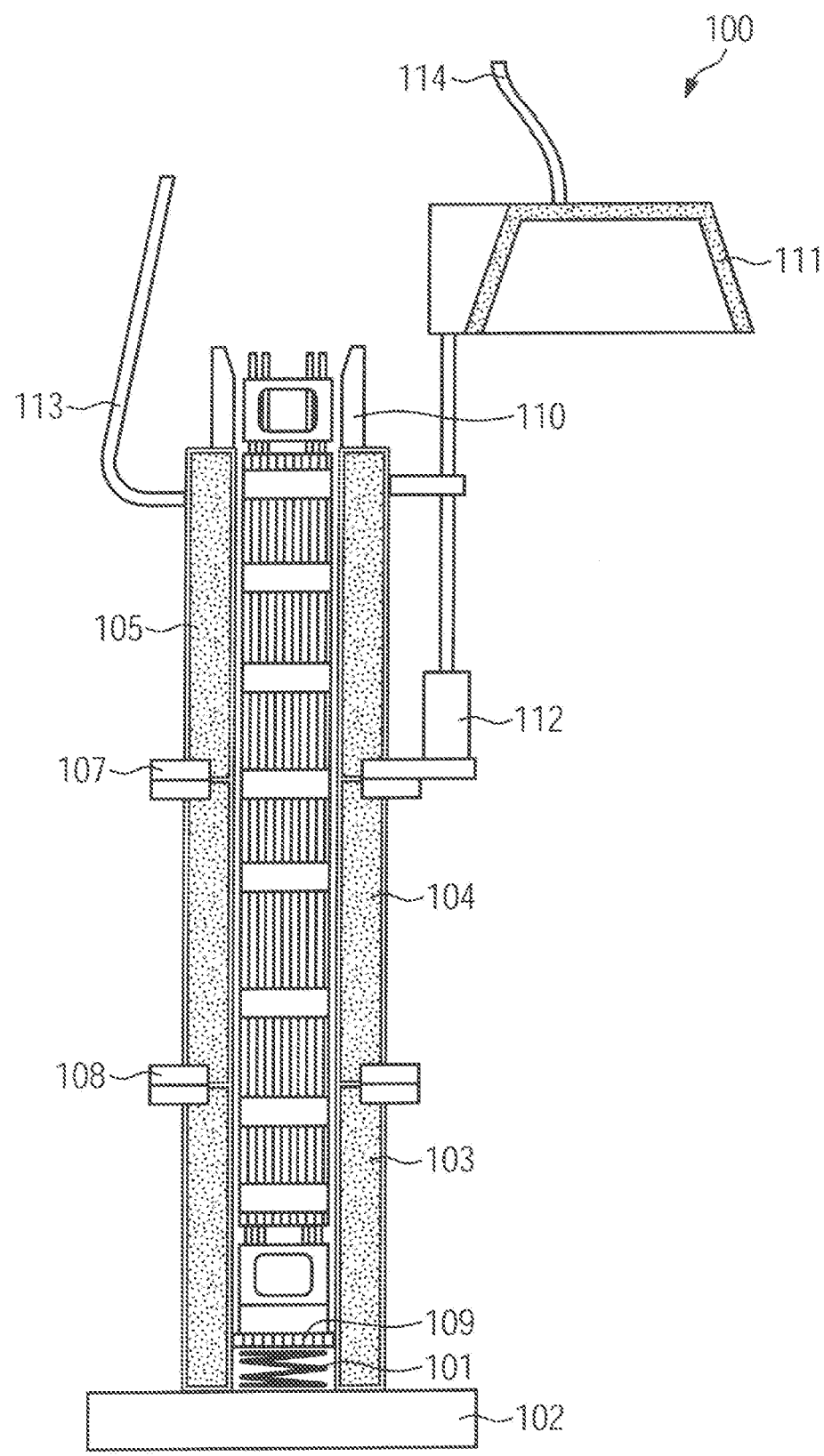

The removal of the gas- and/or liquid sample is preferably carried out with the device 100 schematically depicted in FIGS. 2 and 3. The device 100 is designed for expelling fission products from defective fuel rods and for the removal of liquid- and/or gas samples from the environment at least of one defective fuel rod. The device 100 can be provided as part of a box sipping system.

The device 100 is mobile and has a separate heating device 101. The device 100 is placed under water on a work support 102 in the fuel assembly storage basin and comprises a plurality of structural elements 103, 104, 105, which can be stacked one above another and can be fastened to one another, which in the mounted state define the duct-shaped intermediate space 106, in which a fuel assembly 200 containing fuel rods can be arranged. The depicted example shows a three-part structure.

The structural elements 103, 104, 105 define thermally insulated wall sections of the duct-shaped intermediate space 106 and can be connected to one another via separation zones 107, 108. The structural elements 103, 104, 105 are designed with double walls. Insulating material for thermal insulation is introduced between an outer and an inner wall of the respective structural element 103, 104, 105.

The mounting of the device 100 in the fuel assembly storage basin comprises in particular the following steps: Initially, a lower structural element 103 is mounted on the work support 102. A further, middle structural element 104 is mounted on the lower structural element 103 via the first separation zone 108. A third, upper structural element 105 is arranged above the second separation zone 107.

The longitudinal extension of the structural elements with respect to a vertical axis, therefore with respect to the direction running perpendicular to the work support 102, is adapted to the corresponding length of the fuel assembly 200 to be accommodated.

The structural elements 103, 104, 105 are dimensioned with respect to their cross section so that the fuel assemblies 200 with the largest cross section can be accommodated. Through the use of filling materials, which are introduced into the duct-shaped intermediate space 106, it is optionally possible to adapt both the cross section as well as the length of the intermediate space 106 available for accommodation of the fuel assembly 200. In this way, different types of fuel assemblies 200, which differ in particular with regard to their spatial extension, can be handled.

The flat heating device 101 installed in the lower region of the duct-shaped intermediate space 106 is designed to rapidly heat the basin water located in the duct-shaped intermediate space 106. Between heating device 101 and fuel assembly 200 a grate-like grid element 109 is arranged, which offers only little resistance to the heating.

The duct-shaped intermediate space 106 formed by the structural elements 103, 104, 105 is not designed fluid-tight, rather openings, which permit a free inflow of water, are provided laterally in the walls of the structural elements 103 at the height of the heating device 101.

On the upper end of the duct-shaped intermediate space 106 a guide 110 is mounted, which facilitates the insertion of the fuel assembly 200 with the aid of the fuel assembly loading machine or with the aid of a gripping tool.

Above the duct-shaped intermediate space 106 a hood element 111 can be positioned, which ends just above the upper end of the fuel rods arranged in the fuel assembly 200. By flooding the hood element 111 with a gas, in particular with air, a water-free region is created in the upper region of the fuel assembly 200. However, the fuel rods themselves are not thereby exposed. The free convection between water entry at the lower end of the duct-shaped intermediate space 106 and the upper section of the fuel assembly 200 towards the fuel assembly storage basin is prevented and thus leads to the heating of the fuel assembly 200 by self-heating.

The heating is optionally assisted, in particular in the case of fuel assemblies with a long decay- or storage time, with the aid of the heating device 101. An overheating, which, for example, is visible through water evaporation in the lower region of the fuel rods, can be avoided, since basin water can continue to flow in in the lower region of the duct-shaped intermediate space 106 and thus the fuel rods constantly remain surrounded by water.

The hood element 111 is also designed with double walls. Thermally insulating insulation material is located between an inner and an outer wall of the hood element 111 or a vacuum is applied, for the same purpose.

The hood element 111 is further provided with a drive unit 112, which is designed as a lift-rotary drive. The hood element 111 is thus remotely controllable or manually adjustable in such a manner that said hood element can be placed over the structural elements 103, 104, 105 by rotation about the vertical axis and by translation parallel to the vertical axis, in such a manner that the duct-shaped intermediate space 106 is covered. FIG. 3 shows the device 100 in the open position, whereas the hood element 111 in FIG. 2 covers the duct-shaped intermediate space 106.

By lifting and rotating the hood element 111 a free access to the fuel assembly 200 can thus be provided from above. In the case of an emergency this process can also be carried out manually with rod tools.

In an upper region of the duct-shaped intermediate space 106 a line section 113 is arranged, which is provided for the connection of the analysis device 10 to the first line 12, in particular via the first inlet 11. A further line section 114, which is provided for the connection to the second line 22 of the analysis device 10, in particular via the second inlet 22, has an inlet for gas, which is arranged in the region of the hood element 111. This further line section 114 furthermore is used preferably for blowing in gas, in order to form the gas cushion G underneath the hood element (see FIG. 3).

For the economical implementation of the sipping processes, it makes sense to work with two devices 100 designed in this way. A first device 100 is thereby used for testing a fuel assembly 200, while a second device 100 is loaded or unloaded with another fuel assembly.

The sipping process is as follows: Initially, the device 100 is in the open position (FIG. 3). In this state, the water sample is taken to measure the background activity. After the insertion of the fuel assembly 200 the hood element 111 is closed (FIG. 2) and the gas cushion G is introduced via the further line section 114. After reaching a minimum heating time period, which is checked with the aid of a temperature measurement, the actual sipping test, that is, the removal of the liquid sample and the gas sample, can be carried out. The evaluation is made with the aid of the analysis device 10, which is fluidically connected with the device 100. In this connection, the line section 113 of the device 100 is connected with the first line 12 of the analysis device 10 and the further line section 114 of the device 100 is connected to the second line 114 of the analysis device 10. The liquid sample and the gas sample are fed into the analysis device 10. The totality of analysis device 10 and device 100 forms the analysis system.

After discharging the gas underneath the hood element 111 the latter can be opened again and the fuel assembly 200 can be removed.

The advantages of the device 100 designed as a box sipping device in connection with the above-described analysis device 10 are in particular the following:

No vacuum-tight housing, which could impair the inherent safety, is required. The analysis system exemplarily described is characterized, inter alia, by a passive failure protection with regard to adequate cooling of the fuel rods or the fuel assembly during the sipping process.

The device 100 comprises double-walled structural elements 103, 104, 105, the outer and inner surfaces of which are formed in particular from smooth steel sheets. With this arrangement an easy decontamination is possible both of the inside defining the duct-shaped intermediate space 106, as well as of the outside of the device 100. This promotes the radiation exposure due to the reduction of a possible contamination. Through the blown-in gas cushion G an effective thermal insulation is realized, which can be constantly maintained and remain controllable when leaks occur. The gas cushion G offers a thermal insulation for the surrounding water in the fuel assembly storage basin and at the same time an overheating is excluded by the control of the level of the water coverage of the fuel rods. With regard to the thus resulting spatial distance and the absence of the moderator from a fuel assembly 200 handled in the immediate environment the subcriticality is given.

The arrangement of the heating device 101 in the lower region of the duct-shaped intermediate space 106 in conjunction with the natural self-heating of the fuel assembly 200 brings about in the sipping process a thermal flow upwards and thus a concentration of the fission products, in particular dissolved fission products, to be analyzed in the upper region of the duct-shaped intermediate space 106. Gaseous fission products accumulate accordingly in the gas cushion G underneath the hood element 111. The removal of the gas- and liquid samples to be analyzed takes place in this region.

The separate heating device 101 makes it possible that fission products can also be expelled in sufficient concentration from fuel assemblies 200 or from fuel rods after a long decay- or storage time.

The analysis device 10 makes possible an analysis both of liquid—as well as of gas samples. In addition, if desired, gas contained in the liquid sample can be examined. Furthermore there is the possibility of the additional evaluation of the liquid- and/or gas sample in a radiochemistry laboratory. The analysis results are therefore characterized by a high reliability. Due to the simple handling and the technology used a rapid execution of the sipping process is possible. The repair effort is low due to fewer active components, which also promotes the reduction of a possible radiation exposure.

A temperature sensor 116, which is shown schematically in FIG. 2, may be arranged within duct-shaped intermediate space 106 for measuring the temperature of the basin water contained therein and/or of the gas cushion contained therein, so that in particular the heating process for the expulsion of fission products from the defective fuel rods can be monitored.

LIST OF REFERENCE SIGNS 10 analysis device
11 first inlet
12 first line
13 pump
14 valve
15 outlet
16 radiation shield
17 first detector
18 separation device
19 supply line 20 check valve
21 connecting line
22 second inlet
23 second line
24 throttle valve
25 level regulator
26 regulator valve
27 outlet
28 drying device
29 second detector
30 level regulator
31 regulator valve
32 radiation shield
33 gas pump
34 outlet
100 device
101 heating device
102 work support
103 structural element
104 structural element
105 structural element
106 intermediate space
107 separation zones
108 separation zone
109 grid element
110 guide
110 hood element
112 drive unit
113 line section
114 line section
200 fuel assembly
G gas cushion

What is claimed is:

1. An analysis device for the detection of fission products by measurement of a radioactivity, comprising:
    a first line for carrying a liquid sample;
    a first detector connected to the first line and configured for measuring the radioactivity of fission products contained in the liquid sample;
    a second line for carrying a gas sample;
    a second detector connected to the second line and configured for measuring the radioactivity of fission products contained in the gas sample, the first line and the second line each including an inlet side configured for connection to an expelling device configured for expelling fission products from at least one defective fuel rod and for removing liquid and/or gas samples containing fission products from the environment of the at least one fuel rod; and
    a separation device, separate from the expelling device, for separating gas from the first line carrying the liquid sample, the separation device including a line having an outlet opening for gas separated from the liquid sample, the outlet opening fluidly connected to the second line in such a manner that the gas separated from the liquid sample is suppliable as a gas sample through at least part of the second line to the second detector for measuring the radioactivity of fission products contained therein,
    the analysis device being configured such that gas samples expelled from the expelling device are suppliable to the second detector via the inlet side of the second line configured for connection to the expelling device and gas samples separated from the liquid sample are suppliable to the second detector via the line of the separation device having the outlet opening for gas separated from the liquid sample.

2. The analysis device according to claim 1, further comprising a closable outlet, which forms a sampling point for a water sample, branching off from the first line.

3. The analysis device according to claim 1, wherein the separation device is arranged downstream of the first detector.

4. The analysis device according to claim 1, wherein the first detector is configured for measuring gamma radiation.

5. The analysis device according to claim 4, wherein the first detector is designed as a gamma spectrometer.

6. The analysis device according to claim 1, wherein the second detector is configured for measuring beta radiation.

7. The analysis device according to claim 6, wherein the second detector is designed as a scintillation counter.

8. The analysis device according to claim 1, wherein at least one of the first and the second detector is provided with a radiation absorbing radiation shield for shielding ambient radiation.

9. The analysis device according to claim 1, further comprising a drying device, a drying product or a membrane contactor, configured for separating moisture, which is contained in the gas sample carried in the second line.

10. The analysis device according to claim 1, wherein filling materials are arranged within the separation device for increasing a phase boundary interface.

11. An analysis system, comprising:
    the analysis device according to claim 1,
    the expelling device configured for expelling fission products from at least one defective fuel rod and for removing liquid and/or gas samples containing fission products from the environment of the at least one fuel rod, the expelling device being fluidically connected to the analysis device by a first line section connected to and configured for providing the liquid sample to the inlet side of the first line and by a second line section connected to and configured for providing the gas sample to the inlet side of the second line.

12. The analysis system according to claim 11, wherein the expelling device forms a lowerable structure with an inner duct-shaped intermediate space, in which the at least one fuel rod or a fuel assembly comprising at least one fuel rod is introducible, an upper end of the intermediate space being coverable by a hood element in such a manner that above the intermediate space and below the hood element a gas cushion is formable by blowing in a gas.

13. The analysis system according to claim 12, wherein the inner duct-shaped intermediate space is formed by a plurality of structural elements stacked one above another on a lowerable work support and which are fastenable to one another.

14. The analysis system according to claim 12, wherein the hood element is configured with a double wall, wherein insulating material for thermal insulation is arranged between an outer and an inner wall of the hood element.

15. The analysis system according to claim 12, wherein the hood element is remotely controllably adjustable by a drive unit with respect to a vertical axis of the expelling device.

16. The analysis system according to claim 15, wherein the hood element is height-adjustable parallel to the vertical axis and/or can be rotated about the vertical axis.

17. The analysis system according to claim 12, wherein the expelling device includes a heating device arranged at a lower end of the duct-shaped intermediate space opposite the hood element.

18. The analysis system according to claim 12, wherein the expelling device includes a temperature sensor arranged within the inner duct-shaped intermediate space for measuring the temperature of basin water contained therein and/or of the gas cushion contained therein.

19. The analysis system according to claim 12, wherein the expelling device forms a structure which is lowerable in a fuel assembly storage basin, transport container basin or reactor basin.

20. The analysis system according to claim 13, wherein the structural elements are configured with a double wall, wherein insulating material for thermal insulation is arranged between an outer and an inner wall of the respective structural element.

* * * * *